UNITED STATES PATENT OFFICE.

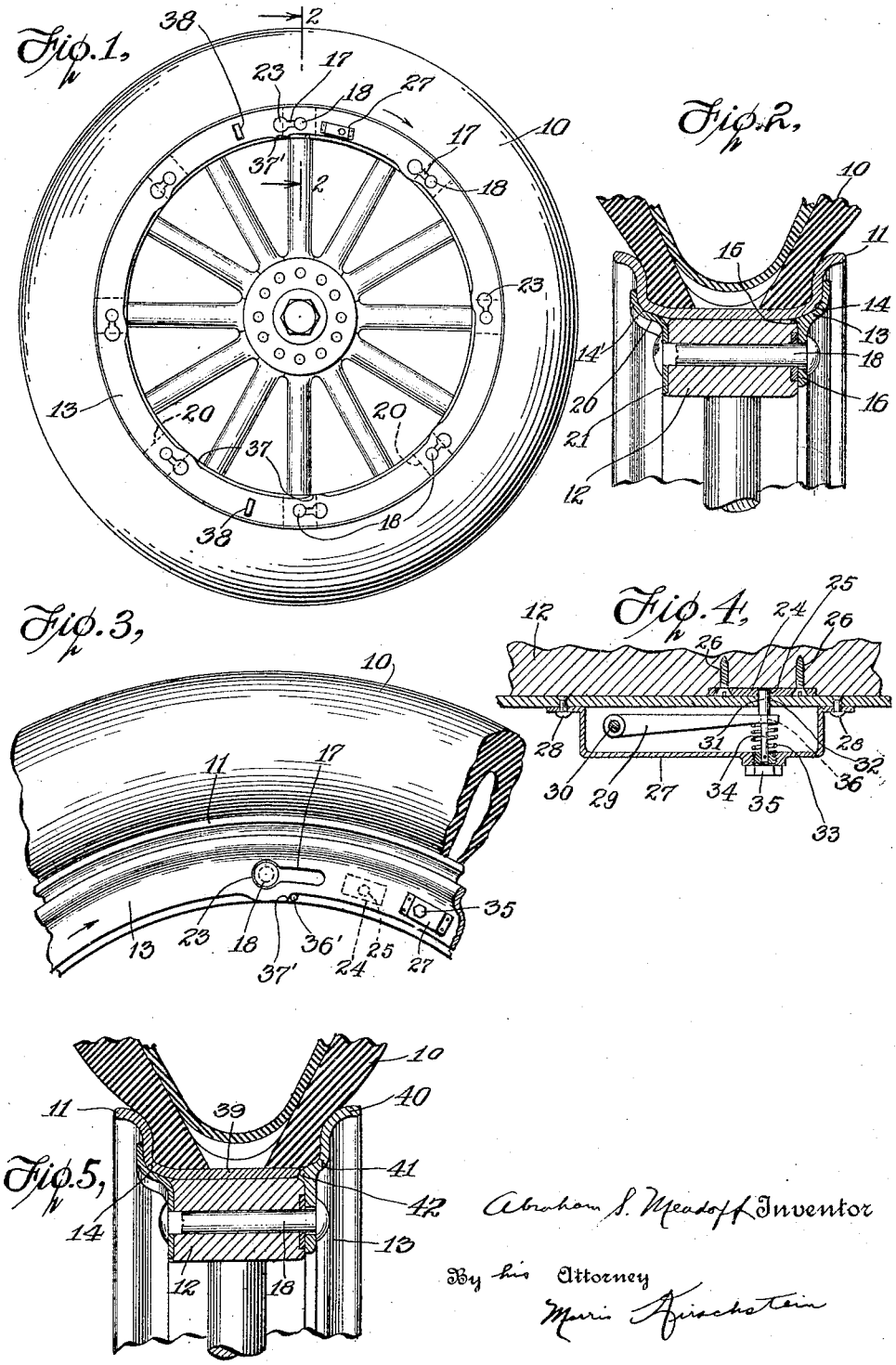

ABRAHAM S. MEADOFF, OF NEW YORK, N. Y.

AUTOMOBILE WHEEL.

1,410,209.  Specification of Letters Patent.  Patented Mar. 21, 1922.

Application filed February 1, 1919. Serial No. 274,587.

*To all whom it may concern:*

Be it known that I, ABRAHAM S. MEADOFF, a citizen of the United States and resident of New York city, in the county of Kings and State of New York, have invented certain new and useful Improvements in Automobile Wheels, of which the following is a specification.

This invention relates to automobile wheels, and is directed particularly to an improved attachment therefor to be used in conjunction with the type of automobile tire rims known as demountable rims.

The main object, therefore, of this invention is to provide an attachment for automobile wheels which shall enable one to remove the tire and the rim on which it is held in a very short time by means of a very simple and effective operation.

Another object of this invention is to provide an attachment of the character described which shall not only serve as the holder for the tire but shall also be of such construction as to enable the rim and tire to be easily removed in a short time.

A further object of this invention is to provide an attachment for automobile wheels which shall effectively accomplish the purposes hereinbefore set forth, shall be attachable to the ordinary tire rim wheel with demountable tire rims as heretofore made, and shall be cheap to manufacture, thus permitting the advantages herein described without much additional cost.

Other objects and advantages of this invention will appear from the detailed description and the features of novelty will be particularly pointed out in the claims.

In the drawing accompanying this specification,

Fig. 1 is a vertical elevation of a tire rim provided with an embodiment of this invention, Fig. 2 is an enlarged detailed section, taken along line 2—2 of Fig. 1, Fig. 3 is an enlarged elevational view, partly broken away, showing the novel attachment before it has been locked on the wheel, and Fig. 4 is an enlarged sectional view showing the mechanism of one form of locking means.

Fig. 5 is a section similar to Fig. 2 showing a modification in which the novel attachment serves at the same time in part as a holding frame for the tire.

Referring in detail to the drawing, 10 is the automobile tire mounted on the demountable rim 11 which is set in the usual manner on the felly 12.

The novel attachment for holding the demountable rim to the felly will now be described in detail. It consists of a ring 13 shaped so as to receive one curved side 14 of the demountable rim and having an extended portion 15 which enters underneath the rim 11 above the felly, thus spacing the tire rim from the felly. This ring 13 is further provided with a flat portion 16 designed to seat flush with the face of the wheel and having therein a perforation 17 adapted to receive a bolt 18, as clearly shown in the drawing.

The other curved side 14′ of the demountable rim is supported by a correspondingly curved plate 20 mounted thereunder on the other side of the wheel and this plate 20 is also provided with a straight portion 21 adapted to seat against the other side of the felly and is perforated to receive the other end of the bolt 18. It will thus be clear that the plates 13 and 20 together with the bolt 18 form a convenient holding structure for the demountable tire rim.

The means provided for the easy removal in a simple and effective operation of the demountable rim and tire will now be described. As will be clear from the drawing, the ring 13 is provided at spaced intervals with the slots 17 curved parallel to the curvature of the wheel and these slots terminate in an enlarged circular opening 23 of larger diameter than that of the heads of the bolts 18. The parallel slot 17 is of sufficient width to allow the whole ring 13 to slide over the body of the bolt. When the whole ring 13 is given a partial rotation in the direction of the arrow in Fig. 1, the said ring moves over the body of the bolt until the head of the latter registers with the enlarged opening 23. The whole ring may then be easily slipped off the wheel by a pull in a direction perpendicular to the front face thereof, and the demountable rim and tire are then easily removed.

In order to prevent the ring 13 from slipping on the wheel after the tire and rim have been replaced, there is provided a locking means consisting preferably of a metal plate 24 countersunk into the face of the felly and permanently fastened thereto by means of the screws 26, and this plate is provided with a perforation 25 designed to register with a corresponding perforation in the body of the ring 13.

A metal casing 27 is permanently secured to the ring 13 by means of the rivets 28 and within said casing is mounted the locking means which consists simply of a lever 29 pivoted at one end on a shaft 30 and provided at the other end with a projection 31 designed to enter the opening 25 through the corresponding opening 32 in the ring itself.

In the position shown in Fig. 4, the ring has been rotated until the casing 27 is disposed over the plate 24 and the projection 31 has entered through the perforation 32 in the ring into the perforation 25 of the plate 24. In this position, the compressed spring 33 holds the projection 31 in and the ring is thus locked on the felly.

As the drawing clearly shows, the projection 31 has continuous therewith a narrowed pin 34 secured to a threaded bolt 35. This pin 34 passes loosely through a perforation 36 in the lever 29 and is rotatable in the former together with the bolt, 35.

Should it now be desired to remove the ring and thus make the demountable rim and tire loose on the felly, all that is needed is to unscrew the threaded bolt 35, and then to pull the same forward, thus extending the spring 33 and causing the lever 29 to rotate outward about the pivot 30, the projection 31 at the same time moving out from the plate 24. A slight rotation in the direction of the arrow in Fig. 1 will then cause the heads of the bolts 18 to register with the enlarged circular slots 23 and the ring 13 may then be easily slipped out from underneath the tire rim 11 which may then be readily removed.

In order to prevent the ring from being rotated through too large an arc, a stop 36' is provided on the felly of the wheel. The ring 13, it will be noted, is formed at the lower edge thereof near the slotted portions with enlarged curved portions 37 to strengthen the ring at these points. One of these enlarged portions adjacent said stop is formed with a flattened portion 37' designed to abut this stop when the ring has been given the desired rotation in the direction of the arrow, as shown in Fig. 3.

To further facilitate the taking off and replacing of the ring 13 small lugs 38 are provided on the face thereof which may be tapped with a hammer or the like tool to help rotate the ring, and if desired a bar may be inserted therein to serve as a convenient means for manipulating the ring.

It will thus be clear that this invention provides a simple and inexpensive means for removably holding the tire and demountable rim to the automobile wheel and enables the said tire and rim to be easily removed and replaced in one simple operation, as contrasted with the plurality of operations heretofore necessitated by the ordinary construction as provided at present.

Having thus described my invention, I claim as new and desire to secure by Letters Patent:—

1. In a device of the character described, the combination of a wheel felly, a rim holding ring, and means for locking said ring against rotation relatively to said felly comprising a spring-pressed pin engaging said ring and said felly in the locked position of said ring, an arm pivoted at one end thereof for supporting said pin, a casing attached to said ring, and a bolt removably mounted in said casing secured to one end of said pin.

2. In combination with a demountable tire rim for automobile wheels, a ring member adapted to be mounted on the front of the wheel, said ring being formed with an upper curved portion conforming to the contour of the front side of the tire rim, plates disposed opposite said ring member on the rear of the wheel, said plates having upper curved portions conforming to the contour of the rear side of the tire rim, said curved portions being in alignment with the corresponding curved portions of the ring, there being spaced slots in the face of said ring, said slots being enlarged at one end, bolts passing through said slots and the felly of the wheel adapted to hold said plates and said ring to the felly and against the sides of the tire rim, said slots permitting the ring to be rotated till the heads of the bolts register with the enlarged portions of the former whereby the ring is then made loose on the wheel and may be removed therefrom leaving the tire rim loose on the felly, means for locking said ring against rotation relatively to said felly comprising a spring-pressed pin engaging said ring and said felly in the locked position of said ring, and means for releasing said pin.

3. In combination with a demountable tire rim for automobile wheels, a ring adapted to removably hold said tire rim on the felly of the wheels, means for removably holding said ring to the wheel, locking means on said wheel and said ring adapted to lock said ring against movement relatively to said felly comprising a spring-pressed pin engaging said ring and said felly in the locked position of said ring, an arm pivoted at one end thereof for supported said pin, a casing attached to said ring, and a bolt removably mounted in said casing secured to one end of said pin.

4. In combination with a demountable tire rim for automobile wheels, a ring adapted to removably hold said tire rim on the felly of the wheel, said ring having spaced slots in the face thereof, means passing through said slots for holding the ring to the front of the felly of the wheel, said slots having at one end an enlarged circular opening, said ring being rotatable until said holding means lie loosely in said enlarged openings whereby said ring is made loose on the felly and easily removable therefrom, the tire rim remaining loose on the felly when said ring is removed, means for locking said ring against rotation relatively to said felly comprising a spring-pressed pin engaging said ring and said felly in the locked position of said ring, and means for releasing said pin.

5. In combination with a demountable tire rim for automobile wheels, a ring adapted to removably hold said tire rim on the felly of the wheel, said ring having spaced slots in the face thereof, means passing through said slots for holding the ring to the front of the felly of the wheel, said slots having at one end an enlarged circular opening, said ring being rotatable until said holding means lie loosely in said enlarged openings whereby said ring is made loose on the felly and easily removable therefrom, the tire rim remaining loose on the felly when said ring is removed, means disposed on said ring and on said wheel for suitably limiting the rotation of said ring, means for locking said ring against rotation relatively to said felly comprising a spring-pressed pin engaging said ring and said felly in the locked position of said ring, and means for releasing said pin.

Signed at New York city, in the county of New York and State of New York, this 16th day of December, A. D. 1918.

ABRAHAM S. MEADOFF.